WHEEL GAUGE

Original Filed July 7, 1945 2 Sheets-Sheet 1

INVENTOR.
BIAGIS CASTIGLIA
BY
Paul A. Talbot.
ATTORNEY

WHEEL GAUGE

Original Filed July 7, 1945 2 Sheets-Sheet 2

Inventor

BIAGIS CASTIGLIA.

By Paul A. Talbot.

Attorney

United States Patent Office

Re. 24,186
Reissued July 24, 1956

24,186

WHEEL GAUGE

Biagis Castiglia, New York, N. Y., assignor to Wheel Aligning Necessities, Inc., New York, N. Y., a corporation of New York

Original No. 2,608,000, dated August 26, 1952, Serial No. 603,701, July 7, 1945. Application for reissue May 27, 1953, Serial No. 357,939

12 Claims. (Cl. 33—203.18)

Matter enclosed in heavy brackets [ ] appears in the original patent but forms no part of this reissue specification; matter printed in italics indicates the additions made by reissue.

My invention relates to a gauge for determining the alignment of vehicle wheels and the camber, caster, king pin inclination, and other characteristics, particularly relating to the front wheels of automobiles, trucks, buses, etc.

Among the purposes and objects are to provide:

A simple wheel guage which may be quickly and easily attached to the vehicle.

A wheel gauge which indicates camber, caster, and other wheel characteristics with the exercise of the minimum of operations and time.

A self-aligning attachment for wheel gauges to wheel hubs.

A spiral actuated level for wheel gauges.

A simple wheel turn angle indicator attachment.

A pair of movable and sationary indicators for determining the principal characteristics of a wheel, such as camber, caster, misalignment, king pin inclination, etc.

I accomplish these and other objects by the construction described herein and shown in the accompanying drawing forming a part of this, my disclosure.

In the drawings.

Similar reference characters refer to similar parts throughout the several views of the drawings and in the specifications.

General description

Reference is made to my copending patent application for Wheel Gauge for Vehicles, filed April 21, 1943, Serial 483,898, patented March 23, 1948, No. 2,438,358, which sets forth similar objects and functions, as well as generic structural matter particularly with regard to the level adjusting means, spindle securement held to abut the end of the wheel hub, the drum calibrations and operation, turntable, etc.; and the general purpose and advantages of my invention.

The purposes and advantages of wheel gauges to determine the characteristics of the front wheels, their alignment suspension, steering and mounting, are becoming well known to service men and the operators of vehicles generally and need not be detailed herein further than to point out that the ease of steering, wear on tires, and road comfort and safety depend on accurate adjustment of the wheels; the wheel gauge makes this possible because the wheel mounting is subject to change, not only by accident but due to many other causes during the life of the vehicle.

Wheel gauges must be designed to be quickly applied and the indication of the characteristics of the wheel easily determined, to be of practical use by the service man; it is with this in view that my improvement herein disclosed are of particular importance.

I have described in detail in the following specifications, a preferred embodiment of my invention so that it may be more easily understood by one skilled in the art to which this invention pertains rather than to attempt to describe all possible modifications which might be made without departing from the principles underlying my invention and as set forth in the claims which follow this disclosure.

Specifications

Figure 7:
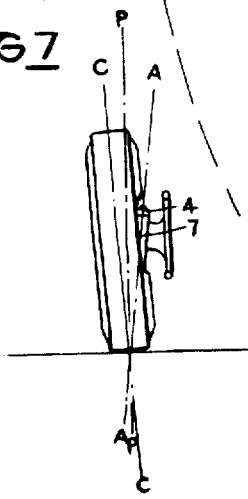
Fig. 7 is a diagrammatic front elevation of one of the wheels showing the king pin inclination and camber angle.
Figure 8:
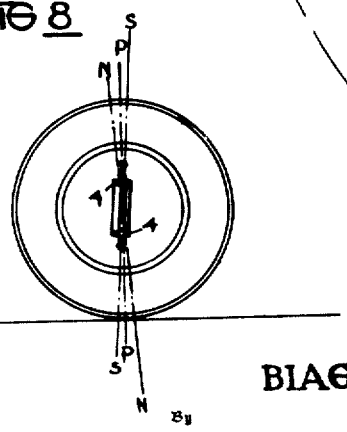
Fig. 8 is a diagrammatic side elevation of one of the wheels showing the caster angle.

Referring to the drawings, and particularly to Figs. 7 and 8, I have shown the front vehicle wheels 1 and 2, which are mounted to rotate about their respective spindles 3, which are swingingly mounted, by means of their respective steering knuckles 4 and their respective king pins, designated by their center point 7, within their steering knuckles and more particularly by their axes, one of which, in Fig. 7, is represented by the line A—A, and in Fig. 8 by the line S—S or N—N. It is to be noted that these lines are at an angle to the perpendicular line P—P in both views, one of the views being taken at right angles from the other. The line A—A, Fig. 7, is at an angle to the line P—P; this is known as king pin inclination or the angle of the king pin inclination. Referring particularly to Fig. 8, the angle between the line S—S and the perpendicular line P—P is known as positive caster or the angle of positive caster and the line N—N negative caster, the angle between N—N and P—P is the angle of negative caster. When the lines A—A, N—N, S—S and P—P are in parallelism there is no king pin inclination or caster. The line P—P is perpendicular to a level floor or the earth's horizon. The line C—C, Fig. 7, is perpendicular to the axis of the spindle 3, about which the wheel rotates. The faced end 16 of the hub 16 is in parallelism with the line C—C and serves as an accurate means for holding my gauge when held in abutment. The angle between the line C—C and P—P is the camber angle.

The steering arms shown by the lines 5 and 6 are disposed at an angle to each other rather than parallel so that when the wheels are swung to turn the course of the vehicle, the wheel at the outside of the turn will be moved, around the king pin less than the wheel at the inside of the turn, the points 7 through which the axis A—A passes being farther apart than the points 8 at which the free ends of the steering arms are connected by and to the tie rod represented by the line T. The position of the centers on which the arms swing and the length of these arms and the tie rod may vary from various automobiles. However these dimensions are given such a value that when the front wheels are turned, the two front wheels will roll along concentric arcs about a common center even though the wheel on the outside of the turn is at a greater distance from this common center than the wheel on the inside of the turn.

Figure 1:
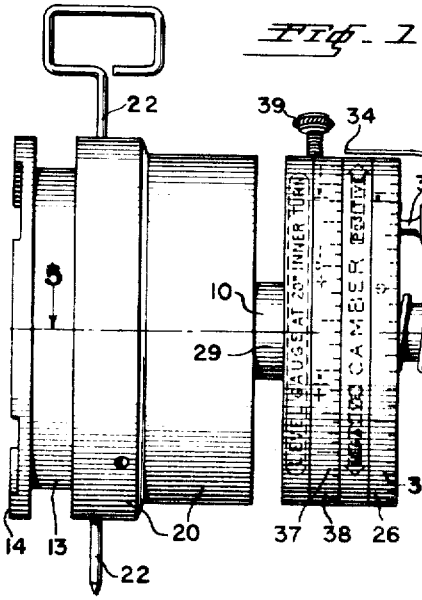
Fig. 1 is a side elevation of the movable part of my gauge.
Figure 2:
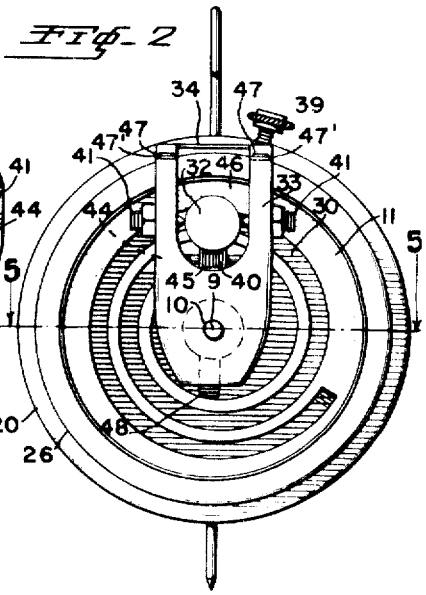
Fig. 2 is an outer end elevation.
Figure 3:
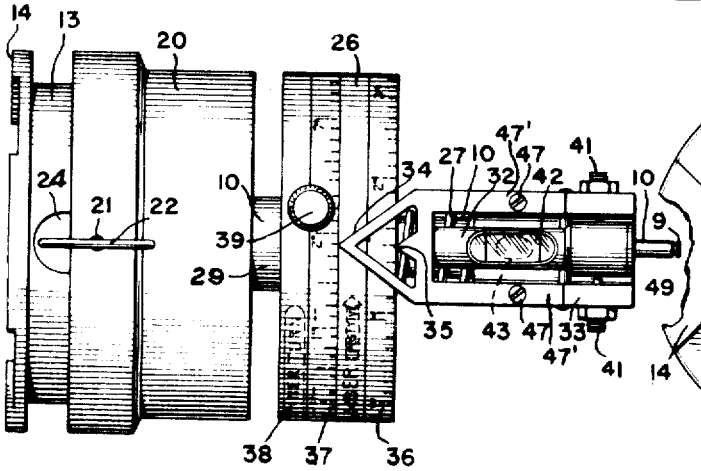
Fig. 3 is a plan view.
Figure 4:
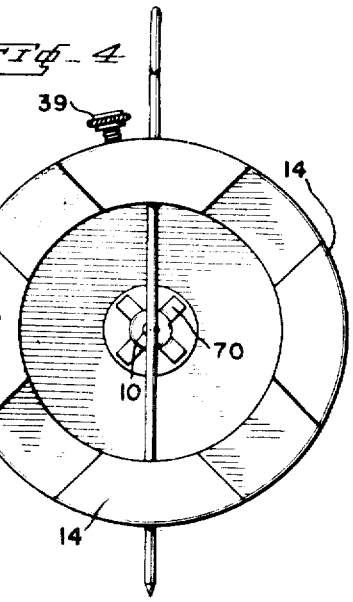
Fig. 4 is an inner end elevation.
Figure 5:
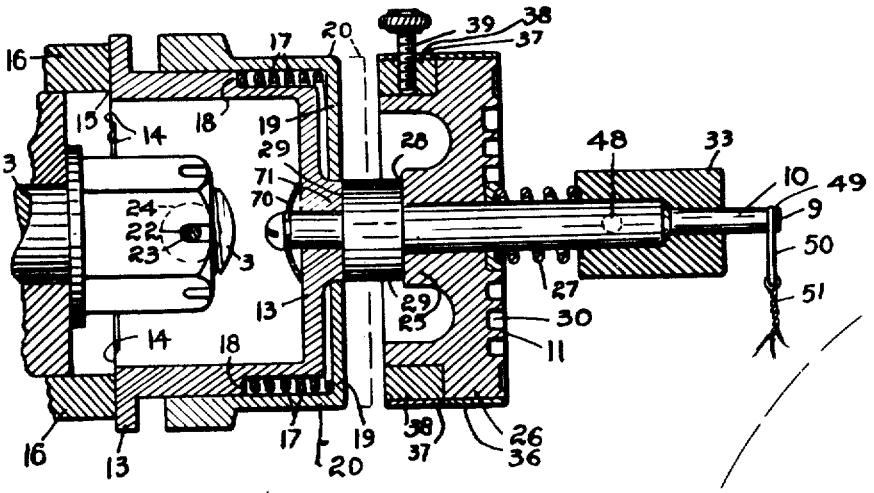
Fig. 5 is a vertical section at 5—5, Fig. 1.
Figure 6:
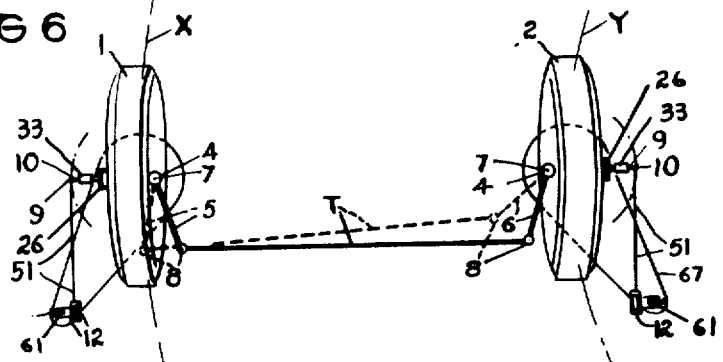
Fig. 6 is a diagrammatical plan view of the wheels, movable and stationary parts of my device.

In Fig. 6, the extreme of travel of the tie rod and arms, in one direction, is shown by broken lines; the center position is shown by full lines. The outside wheel 1 may swing 20 degrees while the inside wheel 2 may swing 24 degrees, thereby to cause the path of travel represented by the outer segment X to have substantially a common radial center (not shown) with the inner segment Y which may be the path of travel of the inside wheel; the difference in the radius of the two segments being substantially the difference in radius between the paths of travel of the wheels 1 and 2 when turned as in steering the automobile around a corner.

The travel of the end 9 of spindle extension 10 which is substantially coaxial with the spindle 3 of the wheel 1 or 2 is measured by the turn indicator 12; duplicate extensions and turn indicators are used. One of each of the pair is attached at one side and the other of the pair at the other side of the vehicle so that the description relating to the travel of one axle extension will serve for the other.

The extension 10 and its end 9, because of the caster, camber, king pin inclination and the difference of travel with respect to the sides of the turn, become an important part of the means, when combined with a level and turn indicator 12, for determining the characteristics of the wheel and its mounting; the measurement of the important parts of which is the function of my device.

The extension 10 is secured at one end to the centering member 13 which is provided with the faces 14 which are pressed against the end 15 of the wheel hub 16 which, together with the wheel, rotates about the spindle 3; the compression spring 17, one end of which rests against the shoulder 18 of the member 13 and the other end of which rests against the inwardly projecting flange 19 of the outer sleeve 20, thus causes the member 13 to be pressed against the hub.

The outer sleeve is provided with diametrically opposed apertures 21 which receive the securing pin 22 which engages the cotterpin aperture 23 of the spindle 3 to hold the outer sleeve against axial movement; clearance holes 24, diametrically opposed in the centering member 13 permit axial movement of the member if desired, by overcoming the spring 17. Thus, by removing the usual cotter pin at the end of the spindle, the pin 22 is substituted, thereby instantly attaching the extension 10 to and in true parallelism with the axis of the spindle 3.

Mounted to revolve on the extension 10, I have provided the drum 26 which is prevented from accidental movement by the spring 27 which presses the face 28 of the hub 25 of the drum against the face of the fixed collar 29. The other end of the spring presses against the face of the spindle attachment 33 which is secured to the spindle extension. I have provided the spiral groove 30 in the face 11 which receives the level adjusting pin 31, which is secured to the oscillating level housing 32 which is swingingly mounted in the extension attachment 33 which is detachably held in fixed relation to the extension 10 and is provided with the pointers 34 and 35 which register with the circumferential calibrations 36 and 37. The calibrations 36 are placed on the drum 26 and the calibrations 37 on the movable ring 38 which may be turned to move on the drum and may be set against relative movement by the thumb screw 39.

A level spring 40 is provided to eliminate lost motion of the level adjusting pin 31 in the spiral groove 30 or any lost motion which would reduce the accuracy of adjusting the level.

The extension attachment 33 is provided with the trunnions 41 on which the level housing 32 is free to swing to adjust the level 42 to bring the bubble 43 into the usual center position designating the level position; the operation of the drum 26 causes the level adjusting pin to move radially of the drum, thereby swinging the level and the position is shown by the calibrations which designate the degrees angularly the extension and spindle may have been moved relative to the horizontal. The level spring 40 is preferably mounted around the pin 44; the ends of the coil of the spring rest against the bottom of the level housing and the bottom 45 of the axially disposed pocket 46, the sides of which extend upwardly to house the level and to which the pointers 34 and 35 are secured by the screws 47 or otherwise. The pointers are preferably formed integral with the resilient bifurcated extensions 47' through which the screws 47 pass.

The extension attachment is secured to the extension by the set screw 48 and the end 9 extends beyond the attachment and is provided with the annular groove 49 to receive the cord attachment 50 which connects the turn indicator 12, the stationary part of my device, to the extension 10 by the cord 51.

The turn indicator 12 is preferably provided with a support comprising a stanchion 61 which is secured to the turn table base 67 or other relatively stationary member such as the running board, fenders, mudguard or a stand. The particular type of turn gauge and the support, for it are not important as many of the well known turn gauges now in use, may serve to determine the turn angle of the wheels, the degrees the wheel may be swung to the right or left of the center position. It is important that the turn gauge shows that the wheel has been turned 20 degrees or a substantial equal distance from the center, or straight ahead position, to determine the king pin angle or inclination as well as other characteristics of the mounting of the wheel.

The extension 10 may be rotated in the centering member 13 and is prevented from accidental movement by means of the spring washer 70 which draws the face of the integral hub 71 of the centering member 13 against the collar 29. Rotating the extension 10 permits the level and extension attachment to be adjusted to an upright position regardless of the position of the pin 22.

The stationary parts such as are supported on the stanchion 61 and the movable parts such as secured to the spindle 3 by the centering member 13, are used in pairs; one of each being on one side and the other on the opposite side of the vehicle side of the vehicle for some of the uses for which my device is adapted, such as determining the turn angle, to detect a bent steering arm, etc.

The position or turn angle of the wheel and the various notations on the calibrations 36 and 37 when compared with the level and turn indicator provide a means of determinating caster, camber, and king pin angle, the center position and degrees of the turn of the axis of the wheel either separately, or when a pair is used, for both wheels.

The caster angle is determined by setting the calibrations 37 at zero, when the wheel is turned to 20 degrees for an inside turn, and the level adjusted to show the bubble 43 at center. The wheel is then swung to the angle of 40 degrees, 20 degrees on the other side of center and the bubble again adjusted to center position, when the wheel is at 20 degrees for an outside turn. The ring 38 and drum 26 are rotated to position the level and the calibrations show the caster angle which appears "positive caster" at one side and "negative caster" at the other side of zero.

The camber angle is determined by noting the angle on the calibrations 36 at either side of the zero position, the level being set at the center position of the wheel. Negative camber is designated at one side and positive chamber at the other side of zero.

The turn gauge determines the angle the wheels may have been turned and the degrees are plainly shown on the drum which is rotated by turning the wheel.

The extension 10 may be formed integral with the centering member 13 and may be constructed in numerous ways to provide a means for rotatably mounting the drums 26 and ring 38.

Any point on the axis of the spindle, in its travel, due to king pin inclination and caster, swings on a plane perpendicular, at a right angle, to the axis of the king pin and not on a plane level with the floor. The amount of the king pin inclination is determined by turning the wheel a known equal number of degrees substantially at the extremes of travel at each side of the central position, noting the indications on the drum due to the adjustment of the level at the extremes as well as at the center position; the calibrations show the king pin inclination.

The king pin inclination is determined from the readings taken on drum 26 or ring 38 at the center and at the extremes of travel of the spindle, as follows: A calculated reading for the center position is obtained by taking the average of the two readings at the two extremes of travel. This calculated reading would be the actual reading of the gauge in the center position, if the king pin inclination were zero. The difference between the actual reading at the center position and this calculated reading for the center position is the king pin inclination.

The king pin inclination causes the level or any point on the spindle extension to travel on an arc; the chord of the arc represents no king pin inclination. The effect of either positive or negative caster at the center position where the reading is taken, is too small to have any practical effect; the actual discrepancy being less than 2 percent. The caster angle being of the order of 1 or 2 degrees likewise causes only a small error in the determination of the king pin inclination.

The angle between the axis of the spindle and true level is the camber indication on the drum.

Having thus described a preferred embodiment of my invention, what I claim as new and desire to secure by Letters Patent is set forth in the claims which follow:

1. In a wheel gauge having means attaching the gauge to the spindle on which the wheel rotates and having an extension coaxial with said spindle, a level and pointer secured thereto, drum means rotatable on said extension to adjust said level, means on said drum means to indicate the position of adjustment of said level and to show the camber angle of said wheel, and a ring rotatable on said drum means and calibrated to show the caster.

2. In a wheel gauge having means attaching the gauge to the spindle on which the wheel rotates and having an extension coaxial with said spindle, a level and pointer secured thereto, drum means rotatable on said extension to adjust said level, means on said drum means to indicate the position of adjustment of said level and to show the camber angle of said wheel, a ring rotatable on said drum means and calibrated to show the caster, said means indicating the chamber angle comprising calibrations on said drum means rotatable on said extension, and means detachably securing said ring against rotation on said drum means.

3. In a vehicle wheel gauge in which the axle spindle of the wheel is provided with an extension in substantial parallelism with the axis of the wheel and said spindle, and a device for determining the angular position of the wheel when moved as when steering the vehicle, a level, and a calibrated drum rotatable on said extension, said drum having indicia thereon to indicate wheel mounting characteristics, said drum having a groove increasing radially, and means secured to said level engaging said groove to adjust said level by the movement of said drum.

4. In a vehicle wheel gauge in which the axle spindle of the wheel is provided with an extension in substantial parallelism with the axis of the wheel and said spindle, and a device for determining the angular position of the wheel when swung as when steering the vehicle, a calibrated drum rotatable on said extension, said drum having indicia thereon and a radially increasing spiral groove, a level housing pivotally mounted on said extension, a level in said housing, and means engaging said groove to tilt said level, said means comprising a pin on said level housing projecting into said groove, whereby rotation of said drum will tilt said level, and pointers mounted on said extension and cooperating with the indicia on said drum to indicate the angle of tilt of said level and thereby the angles of caster, camber, and king pin inclination.

5. In a wheel gauge for determining the characteristics of the mounting of vehicle wheels such as caster, camber and king pin inclination, having a member adapted to be held in abutment with the end of the wheel hub and in parallelism with the axis of the wheel and its spindle, a level supported by said member and adjustable in relation to the wheel hub and spindle, a drum rotatable on said member having a radially increasing groove, means secured to said level and engaging said groove for adjusting said level with relation to said wheel hub and spindle.

6. In a wheel gauge having a member held in parallelism with the axis of the wheel, a drum, a scale and indicia on said drum and a level cooperating with and movable by rotating said drum on said member for determining the camber angle of the wheel, a ring and a second scale thereon annularly disposed and rotatable on said drum and adjustable in relation to said first scale for determining the caster angle and king pin inclination.

7. In a wheel gauge having a member held in parallelism with the axis of the wheel, a drum, said drum having an annular ring thereon and annularly disposed scales having indicia on said drum and said ring, both said drum and said ring being rotatably mounted in relation to said member, a level and means for tilting said level by rotating said drum in relation to said member, said ring and one of said scales being rotatable on said drum in relation to another of said scales, and means for detachably fixing said ring in adjustable relation to other of the scales, whereby the caster angle and king pin inclination may be determined by said scales on said ring.

8. In a wheel gauge having a member held in parallelism with the axis of the wheel, a drum rotatably mounted on said member, a ring rotatably mounted on said drum, means adjustably securing said ring in relation to said drum, scales and indicia secured to the drum and ring for determining caster, king pin inclination and camber, a pair of pointers in register with the scales, and an extension attachment secured in fixed relation to said member supporting said pointers above and in register with their respective scales.

9. In a wheel gauge having a member extending beyond the wheel spindle and held in parallelism with the axis of the wheel and spindle and having a drum and scales annularly disposed on the drum to show the camber, caster and king pin inclination of the wheel mounting, an extension attachment fixed on said member, and a level tiltably mounted in said attachment, means secured to said level cooperating with the rotation of said drum on said member for tilting said level, said drum and scales being rotatably mounted on said member between said attachment and the end of the wheel spindle and pointers secured to said attachment in register with the scales on said drum to indicate the angle of the caster, king pin inclination and camber.

10. A wheel gauge having the same elements as set forth in claim 9, the means secured to said level cooperating with the rotation of the drum comprising a pin disposed at the end of the tiltable level, the end face of the drum adjacent said pin having a radially increasing spiral groove engaging said pin to tilt the level by the rotation of the drum on the member.

*11. A wheel gauge having a reference member adapted to be held in predetermined alignment with the wheel axis by firm abutment of a locating surface therein with the end of the wheel hub and a level carried by said reference member and adjustable relative to indicia thereon through a predetermined range of angular displacements from a position parallel to said wheel axis.*

*12. A wheel gauge having a reference member adapted to be held in predetermined alignment with the wheel axis by firm abutment of a locating surface therein with the end of the wheel hub, means carried by said reference member for applying a force urging said surface into engagement with said hub, and a level carried by said reference member and adjustable relative to indicia thereon through a predetermined range of angular displacements from a position parallel to said wheel axis.*

(References on following page)

References Cited in the file of this patent or the original patent

UNITED STATES PATENTS

| | | |
|---|---|---|
| 809,275 | Brown et al. | Jan. 2, 1906 |
| 1,114,480 | Jensen | Oct. 20, 1914 |
| 1,520,360 | McClure | Dec. 23, 1924 |
| 1,609,392 | Vinnemeier | Dec. 7, 1926 |
| 1,927,488 | Christiansen et al. | Sept. 19, 1933 |
| 2,032,399 | Button | Mar. 3, 1936 |
| 2,043,162 | Foster | June 2, 1936 |
| 2,059,654 | Quigley | Nov. 3, 1936 |
| 2,074,108 | Graham | Mar. 16, 1937 |

| | | |
|---|---|---|
| 2,079,070 | Johnston | May 4, 1937 |
| 2,115,347 | Sutton | Apr. 26, 1938 |
| 2,176,357 | Palmer | Oct. 17, 1939 |
| 2,194,995 | Bergquist | Mar. 26, 1940 |
| 2,235,321 | Krumm | Mar. 18, 1941 |
| 2,292,968 | Peters | Aug. 11, 1942 |
| 2,308,808 | Graham | Jan. 19, 1943 |

FOREIGN PATENTS

| | | |
|---|---|---|
| 17,189 | Great Britain | 1908 |
| 449,577 | Great Britain | June 30, 1936 |

Disclaimer

Re. No. 24,186.—*Biagis Castiglia*, New York, N. Y. WHEEL GAUGE. Patent dated July 24, 1956. Disclaimer filed Nov. 15, 1956, by the assignee, *Wheel Aligning Necessities, Inc.*

Hereby enters this disclaimer to claims 11 and 12 of said patent.

[*Official Gazette December 25, 1956.*]